United States Patent [19]

Steele et al.

[11] 4,008,210

[45] Feb. 15, 1977

[54] SOLVENT EXTRACTION OF OIL FROM OIL SEEDS

[75] Inventors: Bobby C. Steele, Conyers; Douglas R. Barr, Norcross; Charles T. Hunt, Lithonia; James L. Ayres, Stone Mountain, all of Ga.

[73] Assignee: Gold Kist Inc., Lithonia, Ga.

[22] Filed: Nov. 5, 1974

[21] Appl. No.: 521,145

[52] U.S. Cl. .......................... 260/123.5; 260/412.4; 426/430; 426/457

[51] Int. Cl.$^2$ ........................ A23J 1/14; C11B 1/10

[58] Field of Search ..................... 260/412.4, 123.5; 426/430, 457

[56] References Cited

UNITED STATES PATENTS

| | | | |
|---|---|---|---|
| 2,524,037 | 10/1950 | Beckel et al. | 260/412.4 |
| 2,645,650 | 7/1953 | Ayers et al. | 260/412.4 |
| 2,950,198 | 8/1960 | King et al. | 260/412.4 |
| 3,786,078 | 1/1974 | Finley et al. | 260/412.4 |
| 3,928,635 | 12/1975 | Ohta et al. | 426/430 |

OTHER PUBLICATIONS

"Air Classification of Peanuts in the Production of White Peanut Flour", Spadaro et al., 58th Annual Meeting Program, AACC, Nov. 1973, p. 97.

"De-Oiling of Peanuts to Yield a Potentially Useful Oil Product", Willich et al., Food Technology, vol. XI, No. 6, pp. 332–336, 1957.

*Primary Examiner*—Patrick P. Garvin
*Assistant Examiner*—P. E. Konopka
*Attorney, Agent, or Firm*—Bacon & Thomas

[57] ABSTRACT

The present invention provides a method for the direct solvent extraction of oil from oil seeds to produce a low-fat proteinaceous material which comprises, wet heat conditioning oil bearing seeds to a moisture content of from 6 to 12%, flaking said wet heat conditioned oil seeds, dry heat conditioning said flaked oil seeds to a moisture content of from 1.9 to 6%, and treating said dry heat conditioned flakes with a solvent for the removal of the oil contained in said flakes.

21 Claims, 5 Drawing Figures

SOLVENT EXTRACTION OF OIL FROM OIL SEEDS

BACKGROUND OF THE INVENTION

1. Field of Invention

The importance of high quality protein in human diets has long been recognized, but until recent years, animal protein was the main source of protein and was plentiful and relatively inexpensive. The recent world protein crisis has renewed interest in vegetable protein such as that found in vegetable seeds, nuts and legumes; particularly in view of the inefficient biological conversion of plant protein to animal protein. In the past, various processes were used for extracting oil from vegetable seeds, nuts legumes and the like oil seeds but little attention had been given to the remaining vegetable proteins.

2. PRIOR ART

Oil seeds containing at least 30% oil have been processed for many years with the major interest being the removal of the oil, while regarding the proteinaceous material as by-product. It is to be understood throughout the specification and claims that the expression oil seeds is used in its broadest sense to include those substances known to the art that contain at least 30% oil. Basically the oil is removed by a process which includes cooking, pressing and then extracting the press cake to obtain the desired oil, the remaining proteinaceous material being treated as by-product. For example, it is well known that peanuts are a good source of protein and fat. However, prior methods of processing peanuts have emphasized efficient removal of the oil disregarding the proteinaceous fraction. In fact, some of the processing steps utilized to remove the oil severely damages or destroys functional properties of the remaining protein and renders it unfit or unsatisfactory for subsequent use in numerous food applications. Such functional properties of the protein which are damaged include water solubility, gelling properties and the like.

Conventional processes for removal of oil from oil seeds with greater than 30% oil, such as peanuts, specify extensive cooking, screw pressing followed by solvent extraction. The resulting protein meal product from such a process has low protein solubility, a tan to brown color, and a cooked flavor, all of which makes the product unsuitable for food applications such as use in dietetic drinks and the like where good water solubility is essential. The importance of flavor, while somewhat subjective, cannot be overlooked since, even if a protein has all the desirable properties except for acceptable flavor then its use as an edible food will be severely limited.

In order to improve the yield of oil and the quality of remaining protein various attempts have been made to alter the basic steps of cooking, pressing and extracting the oil from oil bearing seeds and nuts. One such approach is that which is disclosed in the patent to Drenning, U.S. Pat. No. 2,629,722 wherein it is taught that if best results are to be achieved in oil and meal production then the moisture content of the cooked seeds must be closely controlled, evaporation prevented, and the time and temperature of the cooking reduced. Thus, a process is disclosed in which oil bearing seeds and nut meats are first flaked and then treated prior to extraction of the oil by raising the moisture content of the meats to a value of between 12 and 20% by the addition of steam or water and then cooking the meats for a period of time between 7 and 20 minutes at a temperature between 190° and 215° F under such conditions as to insure that evaporation does not reduce the moisture in the seed nut meats below 12%. The oil may then be extracted from the treated (cooked) seed by a combined process involving mechanized pressure followed by solvent extractions. This process is said, among others, to produce a meal of high nutritional value above that obtained from a standard high temperature processing and to achieve higher oil yields. The process was specifically applied to cottonseed meats.

Various modifications of the basic process to facilitate solvent extraction of the oil from oil seeds are known as described in the patents to Gastrock et al., U.S. Pat. Nos. 2,726,253 and 2,727,914 and the patent to Jones et al., U.S. Pat. No. 3,347,885.

The first Gastrock et al patent is directed to a process of preparing oil bearing materials for solvent extraction, which comprises subjecting the unpressed flakes to a mild heat treatment sufficient to make the oil easily extractable but insufficient to seriously damage protein; combined with a crisping treatment, which is a partially dehydrative cooling of the cooked materials, lowering moisture by 2–4%, that converts them to relatively porous and incompressible granules. The thus treated flakes are then countercurrently mixed with separate portions of solvents, and residual solids are removed from each portion of solvent by means of extraction. The process is said to be advantageously used in the solvent extraction of oil from oil bearing seeds having a relatively high oil content, such as cottonseeds, peanuts, sesame, flaxseed, babassu nuts, and the like.

The second Gastrock et al. patent describes the solvent extraction of rice bran oil from rice bran in which the rice bran particles are subject to a mild cooking at a moisture level of at least 14% at the early stages, and then the moisture content is allowed to drop in the latter stages of cooking to from 6 to 18% while the cooking temperature is increased from about 170° and 210° F in the early stage to about 235° F in the final stage. The cooked rice bran particles are then made crisp by exposure to a relatively cool atmosphere conducive to the evaporation of moisture until they undergo a substantially uniform decrease in temperature to below 130° F and a substantially uniform loss of moisture sufficient to lower their moisture content by from about 2 to 4%. Finally, the resultant cooked and crisped rice bran particles without flaking, are mixed with a solvent for a rice bran oil to remove the oil.

The Jones et al. patent relates to a direct extraction of oil and is said to be an improvement on the Gastrock et al process by providing a method for directly solvent extracting cooked cottonseed meat particles by gravity flow or percolation while eliminating the necessity of pre-pressing mildly cooked cottonseed particles. This result is obtained by maintaining a moisture content of from 13 to 14%.

Thus, as can be seen various techniques have been developed to remove oil from oil seed while retaining adequate properties of the remaining protein. However, a completely efficient and effective method of extraction has not yet been achieved in which oil seeds and the like are solvent extracted to provide a proteinaceous material having good functional properties and wide applicability in various food applications.

SUMMARY OF THE INVENTION

The present invention provides a method to directly extract oil with a solvent from an oil bearing seed having a relatively high oil content to produce a low fat proteinaceous material or meal and a miscella having excellent clarity and that can be handled economically and efficiently by conventional methods.

According to the present invention, the oil bearing seed is preconditioned to a moisture content of from about 6 to 12%, to enable flaking to maximize the surface to volume ratio, and then flaked. The flakes are then stabilized by drying to a final moisture content of 1.9 to 6% followed by a solvent extraction to remove the oil and produce a low fat protein having excellent functional properties such as water solubility. The process is particularly effective in the solvent extraction of peanuts.

DESCRIPTION OF THE PREFERRED EMBODIMENTS

Figure 1:
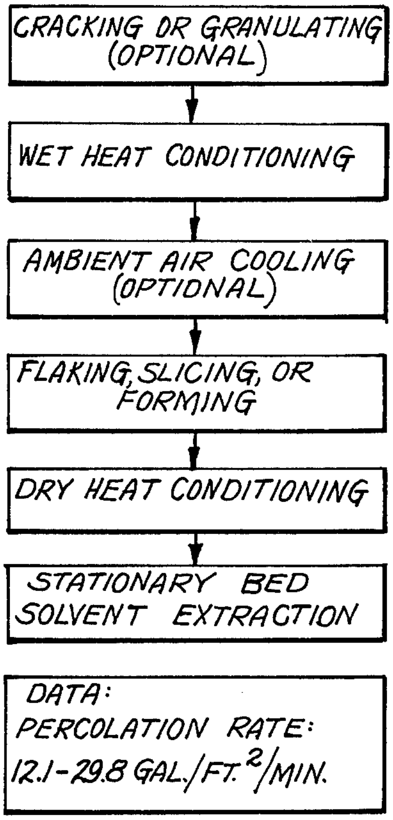
FIG. 1 is a flow diagram of the method of the invention.

This invention is the result of work initiated to develop a means of preparing a high quality protein from oil seeds having oil contents of at least 30%, preferably an oil content of 30–70%. Work was conducted to effectively and efficiently remove the oil at the same oil quality or better than that of the conventional process and to yield a highly functional proteinaceous material.

In order to achieve this, it was recognized that those steps in the prior art processes which destroyed the functional properties of the protein would have to be eliminated or modified. Attempts to efficiently directly extract fat (oil) from the full fat product proved to be unsuccessful. Two significant problem areas developed when such an approach was tried. These problem areas were flaking and bed stability.

It is well known that a large, stable flake has the highest degree of permeability, and is therefore considered to be the most optimum material to extract by means of a solvent extraction system such as a percolation process. The efficiency of solvent extraction is a function of the contactable surface area of the oil bearing material and the permeability of the flake and bed. The most convenient method to obtain material with high surface area is by flaking. However, attempts to flake materials containing at least 30% oil proved difficult since the flake product using conventional equipment had a peanut butter like consistency due to the high oil content. Thus it was determined that the fat bearing material had to be conditioned before flaking.

In addition, a solvent extraction of unconditioned high oil content material results in excessive collapse of the bed. It can be appreciated from the economics of operation that it is most desirable to form a bed of the material to be extracted and allow the solvent to percolate through the bed to extract the fat. Such an arrangement avoids the expense of the additional equipment necessary to slurry extract the fat and also avoids the necessity of subsequent vacuum filtration which often accompanies slurry extraction techniques. However, as noted, solvent extraction of unconditioned high oil materials results in excessive bed collapse making such an extraction commercially unacceptable. The bed collapse is caused by the void volume formed by removal of large quantities of oil from the high oil content material.

More particularly, in order to produce a high solubility white protein flour for edible use, for example, a peanut flour, it was determined to be essential to eliminate or modify certain steps of the prior art process. Although screw pressing removes 70 – 85% of the oil content of an adequately cooked oil seed, such as a peanut, the cooking and heat from mechanical shear destroys the functional protein properties. It has been determined that by preconditioning oil seeds to a moisture content of from 6 to 12% moisture enables subsequent flaking to maximize the surface to volume ratio without forming a material having a peanut butter like consistency. The flakes are then stabilized by drying to a final moisture content of about 1.9 to 6%. This preconditioning enables the oil to be extracted in an efficient manner leaving a protein flour or meal having excellent water solubility.

FIG. 1 is a flow diagram of the process of the this invention including optional steps. In one preferred embodiment, the oil seed is first cracked or granulated and then wet heat conditioned at a temperature of 160°–240° F to a moisture content of 6 to 12%, after which the cracked or granulated material may optionally be subjected to ambient air cooling. The thus conditioned material is then flaked, sliced or formed to provide an increased surface to volume ratio to maximize the mass transfer of oil and solvent and then dry heat conditioned to a moisture content of from 1.9 to 6%, and the solvent extracted.

Wet heat conditioning prior to flaking has proved to be beneficial to efficient oil release and to large, stable flake production. Results obtained from wet heat conditioning can be maintained with or without cooling prior to flaking. The oil seed piece or splits are wet heat conditioned slightly to plasticize the oil seed meat while keeping protein denaturation at a minimum. It has been found that the operational ranges for the wet heat conditioning step includes temperatures from 160° F to 240° F for as long as 45 minutes. The final moisture content of the oil seed should be more than 6% but less than 12% immediately before flaking.

The preferred temperature range for wet heat conditioning is 200° to 220° F for 10 to 20 minutes. The resulting product has a final moisture content of 8 to 11% before being subjected to flaking in the flaking rollers. While wet heat conditioning at temperatures above 240° F for times greater than 45 minutes gives efficient oil removal, the product usage of the remaining protein is limited due to low protein solubility and in the case of peanuts, its off-white color. Of course, it can be appreciated by anyone skilled in the art that the method of wet heating, which may include the direct application of steam or the like, and the time, temperature and moisture interrelationship is dependent upon the final product specifications and the characteristics of the oil seed being wet heat conditioned and can be readily determined. A preferable operating sequence would include a cooling step following wet conditioning to slightly reduce surface moisture. Although optional it is also preferable to reduce the oil seed into six to eight equal pieces before wet conditioning thereby minimizing internal cell damage which would occur if the oil seed was flaked prior to wet heat conditioning. The ultimate conditioning goal of the method involves the physical characteristics of the oil seed, that is, in increase in plasticity before flaking.

Once the oil seed is wet heat conditioned and preferably subjected to ambient air cooling, the oil seed may be flaked, sliced or formed in order to increase the surface to volume ratio to facilitate solvent extraction. While gravity feeding of conditioned oil seed pieces through flaking rolls (Ferrell-Ross, 18" × 24" HD, Oklahoma City, Okla.) set with a spacing of 0.005 to 0.014 inches was utilized in the examples, flakes can be formed by using a variety of conventional techniques and apparatus known to the art. As can be appreciated, thicker flakes decrease the surface to volume ratio and limit the rate of oil extraction from the flake. Thicker flakes also decreases permeability, thereby increasing the residual oil in the proteinaceous product. While thinner flakes enhance extraction rates, they are more fragile and may result in some clogging of the bed due to break up of the flakes. However, the exact thickness of the flakes to provide optimum results can readily be determined by one of the ordinary skill in the art without undue experimentation.

Once the flakes have been formed, they are then dry heat conditioned prior to extraction. The dry heat conditioning prior to extraction permits the solvent to flow quickly through the bed without decreasing the oil removal efficiency of the system by enhancing flake stability during handling. However, the dry heat conditioning does not deleteriously effect the resulting protein solubility.

The operational ranges for the dry heat conditioning prior to extraction include drying to a final product moisture content of about 1.9 to 6%. The preferred method of dry heat conditioning would include rapid drying by a forced conventional heating system that yields a product with a final moisture content of from 2.5 to 4% although other dry heating techniques known to the art may be used.

The oil seed has now been sufficiently conditioned so as to be readily solvent extractable by such solvent extraction processes as stationary bed extraction, counterflow extraction processes, a crossflow extraction process or other known solvent extraction processes. Preferably, the dry heat conditioned flakes can be slurry fed into the extractor. If desired, the extraction process may be carried out under vacuum. The solvent may also be heated to a temperature within the range of from 75° F to 140° F to facilitate extraction. Thus, the oil may be retracted with a "hot" solvent, preferably at a temperature of about 140° F.

The solvent which may be used to extract the oil from the oil seed depends upon the type of oil seed being extracted. The oil bearing seeds having a relatively high oil content include cottonseeds, sesame, flaxseeds, peanuts, sunflowerseeds, babassu nuts and the like, peanuts being particularly well suited to the process. These oil bearing oil seeds also contain lipids, carbohydrates and minor amounts of other material. Any solvent known to the art which is effected to remove the oil may be utilized. Alcohols, ketones, hydrocarbons, halogenated hydrocarbons and the like may be used. Such solvents include hexane, acetone, ethyl alcohol, isopropyl alcohol, methylene chloride, trichloroethane, trichloroethylene, tetrachloroethylene, fluorinated, chlorinated hydrocarbons and the like. A single or mixed solvent may be used in the extraction.

Once the flakes have been conditioned they are placed in a bed and subject to solvent extraction to remove the fat and provide a defatted proteinaceous product having high solubility and finding wide applicability in various food applications. Due to the high solubility of the resulting proteinaceous product, it may be used in such areas as dietetic drinks and the like. The extracted oil contained in the solvent may be separated therefrom by conventional techniques to provide an oil with excellent clarity. Thus, as a result of the specific combination of steps as set forth in FIG. 1, the process of the present invention results in a defatted proteinaceous material having excellent functional properties and an extract having excellent miscellic clarity.

Figure 2:
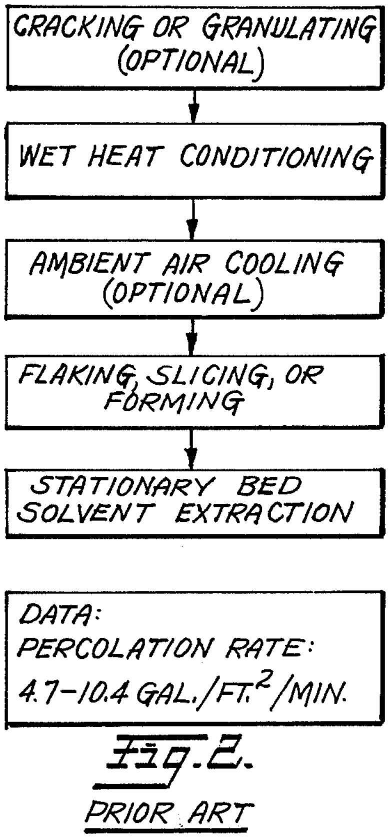
Fig. 2. PRIOR ART
FIGS. 2, 3 and 4 are flow diagrams of the prior art methods.
Figure 3:
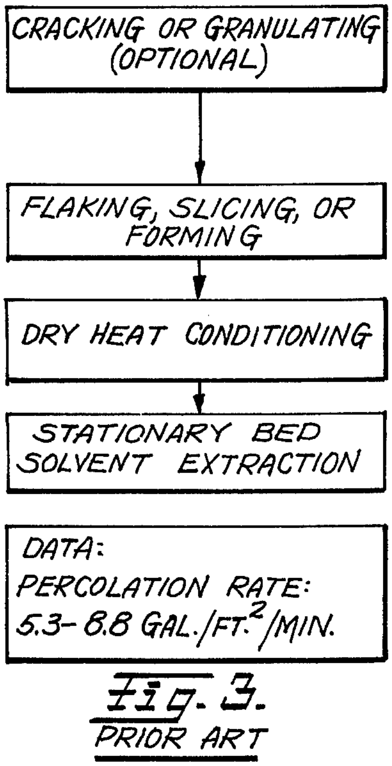
Fig. 3. PRIOR ART
Figure 4:
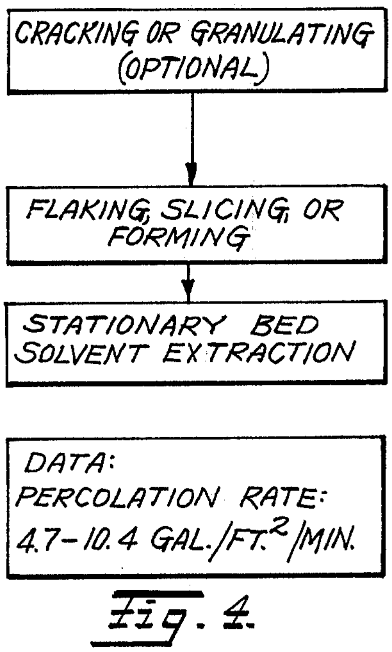
Fig. 4. PRIOR ART

In order to demonstrate the criticallity of the essential steps in the present process which includes wet heat conditioning followed by flaking and then dry heat conditioning, the process was varied by eliminating one or more of the steps and comparing percolation rates. Thus, the common comparison for the process is the percolation rate (after equilibrium), or the rate the solvent flows through the bed of flakes. As can be seen by comparing FIGS. 1 and 2, a percolation of 12.1–29.8 as compared to 4.7–10.4 gallons/ft.$^2$/min. is obtained for the process of the present invention compared to a process with the same steps except for the lack of a dry heat conditioning step. An extraction after flaking and dry heat conditioning and one without either are shown in FIGS. 3 and 4 respectively. The percolation rates are respectively 5.3–8.8 gal./ft.$^2$/min. and 4.7–10.4 gal/ft.$^2$/min. Not only are the percolation rates improved by the process of the present invention, but further benefits such as better miscella clarity, minimal bed collapse are obtained while maintaining the water solubility (NSI), and light color of the protein along with better flake integrity. When peanut is the oil seed extracted, the process unexpectedly removes the bitter, musty "raw" peanut flavor from the remaining protein flour thus rendering the protein exceptionally useful in those food applications where flavor is essential. By the process of the present invention it is possible to obtain a high protein peanut flour having a composition of protein of from 57–65% MFFB, a fat content of 0.5–3%, a moisture content 5–14% and a water solubility (NSI) of 50–90%.

The following examples are provided to illustrate the present invention and to demonstrate the effect of various variables on the process; however, they should not be considered limitations thereof. While the specific examples use peanuts as the oil seeds, the techniques of the invention are equally applicable to other oil seeds as already indicated.

All experimantal designs are known working method described in Chemical Engineering Unit Operations texts such as Unit Operations (W. L. McCable and J. C. Smith, McGraw Hill Book Co., Inc., 1956). Using this process, with modifications where indicated, preliminary testing assumed that all oil seeds must be cracked and flaked prior to any solvent extraction. The process is functional for whole oil seeds or fractions thereof.

The test results as reported in the tables were collected by the use of the following equipment with features as described. Hexane was used as the solvent due to its commercial importance and convenience, but modifications can be made to incorporate other solvents besides hexane. The method used was single pass cross-flow extraction utilizing hexane as the initiating solvent in a 2:1 to 2.5:1 solvent to solids ratio, and at a temperature of 100° F. Current stationary bed extractors are a 5-pass counter-flow-system utilizing varying concentrations of miscella as the initiating solvents. Using fresh hexane for each pass simulates the use of miscella in a counterflow system.

To evaluate extraction parameters such as the percolation rate, static and dynamic holdup, a procedure similar to Blaw-Knox Method 11-12 (BlawKnox Chemical Plants Division, Dravo Corp.; Pittsburg, Pa.; 1962) was used. The procedure and essential apparatus used are shown schematically in FIG. 5.

In this method, a 6-inch ×10-foot glass column 1 fitted with a bottom 40 mesh screen 2 is filled with flaked product. The column is suspended on a weighing scale 3 to facilitate weight determination. The extraction solvent is pumped, by pump 4 through conduit 5 into the column at a flow precisely determined by a flow meter 6; Model 112A10G-3B1A, Brooks Instruments, Hatfield, Ohio; and through conduit 7 via valve 8. The temperature of solvent is controlled by heating coils 9 in the solvent surge tank 10. The solvent is continuously recycled through the column via conduits 5,7 and 11 as indicated unit the oil in the flakes is equilbrated with the miscella, at this point no more oil is being transferred from solid to liquid phase. This equilibrium is determined by no change in gross weight in the column at a fixed flow rate, fixed solvent head, and constant temperature. Equilibrium is verified by determining the % fat in the miscella at intervals over the test period.

The dynamic holdup is determined by obtaining the weight difference between the flooded bed and the drained bed. The static holdup is determined by the difference in weight of drained bed versus the solvent free weight. The solvent free weight is determined by removing the solvent wet flakes from the bed, weighting and air-drying the solvent from the material. Analysis of fat, moisture and protein are made before extraction and after solvent extraction and drying.

In the examples, peanuts with or without skins may be used. Whole peanuts should be split, cracked or granulated to facilitate conditioning steps. A split nut blancer such as a Bauer 341B - 2000 blancher; the Bauer Brothers Co., Springfield, Ohio; can be used to split and/or blanch the whole or split nuts. Cracking rolls such as Ferrel-Ross, 2 Hi 10"×42"; Oklahoma City, Okla. can be used to crack whole or split nuts. The nuts can be granulated with a cutter such as Urschel Model CD Dicer, Ureschel Laboratories Inc., Valparaiso, Ind.

The peanuts can be conveniently wet heat conditioned using direct steam injection in a continuous cooker. In these examples, a steam retort; Dixie Canners Model RDTI-3, Athens, Ga.; was used for conditioning small lots of peanuts under controlled temperature and pressure.

The conditioned peanuts were then flaked at 0.005–0.014 inches using flaking rolls such as Ferrel-Ross 18" × 24" HD Flaking Rolls. After flaking, peanuts are dried in a continuous drier. In these examples a Proctor and Schwartz Portable Lab Dryer, Philadelphia, Pa. was used.

Analytical tests were applied to the bed media and the miscella at various stages of the process. Oil seeds used in these examples were both blanched and unblanched peanuts.

All chemical analyses were performed in accordance with AOCS procedures, as follows:

| | |
|---|---|
| Protein | Aa 5–39 AOCS |
| Fat | Ab 3–49 AOCS |
| Crude Fiber | Bc 6–49 AOCS |
| Ash | Bc 5–49 AOCS |
| Moisture | Ab 2–49 AOCS |
| NSI (Nitrogen Solubility Index) | Ba 11–65 AOCS |
| WSP (Water Soluble Protein) | Ba 11–65 AOCS |

EXAMPLE 1

This example illustrates the effect of pretreatment on peanuts before conditioning by comparing extraction parameters.

100 lbs. of peanuts were sprayed with water (ca 1 lb.) and dried at 200° F for 10 minutes to loosen skins prior to split nut blanching using a Bauer 341 B -2000 split nut blancher.

1a). 30 lbs. of blanched peanut splits were heated at 220° F. for 12 min. in a retort, Dixie Canners Model RDTI-3. The conditioned peanuts were then flaked on a Ferrel-Ross flaking roll Model 18" × 24" HD, with a roll gap of 0.005 – 0.008 inches to obtain a final flake average thickness of 0.025 inches. The flakes were then dried in a Proctor-Schwartz Portable Lab Dryer at 180° F for 18 minutes.

1b. 30 lbs. of blanched peanut splits were cracked on a Ferrel-Ross cracking roll Model 2 Hi-10"×42" utilizing only the bottom roll set with a spacing of 3/16 inch. The cracked peanut pieces were then conditioned and flaked as in 1a above 1c. 30 lbs. of blanched peanut splits were granulated on an Urshel Comitrol Granulator Model CD Dicer Valparaiso, Ind. Straight cut knives spaced at 3/16 inches were utilized to generate the granulated pieces. The granulated pieces were then conditioned and flaked as in 1a above.

Fat and moisture analysis (by AOCS methods) of the flaked peanuts were made before and after dry conditioning and results are recorded in Table 1.

Figure 5:
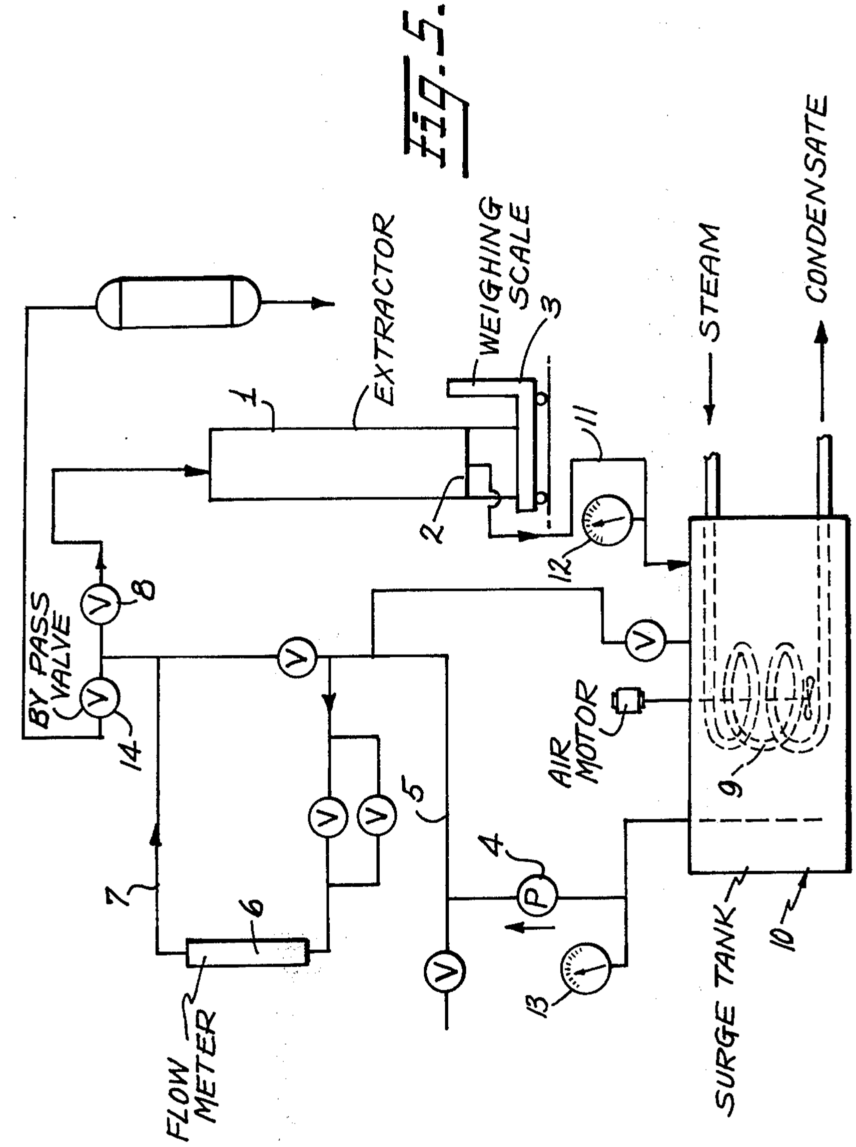
FIG. 5 is a schematic representation of the method and apparatus used in the pilot plant tests of the present invention.

20 lbs. of flakes prepared by the process of respectively 1a, 1b, and 1c were placed in 6 inch × 10 foot tared circular glass column constructed as illustrated in FIG. 5, to a bed depth as recorded in Table 1.

2 lbs. of solvent for each pound of flakes in extraction column 1 was placed in surge tank 10 as shown in FIG. 5. The solvent was heated by steam through heating coil 9 and maintained at 100° F. The temperature is measured by temperature gauges 12 and 13. Solvent was recycled for 30 min. to assure fat-solvent equilibrium between flakes and miscella. After equilibrium had been reached, percolation rate was measured by flowmeter 6 shown in FIG. 5 and checked after each measurement by collecting timed weight of miscella from bypass valve 14 shown in FIG. 5 which is normally closed. The percolation rate reading were converted to gal./mins./ft$^2$ and are recorded in Table 1.

A sample of the miscella was taken and weighed, evaporated in vacuo and dried at 100° C for 30 minutes weighted and fat composition determined by difference. The total fat removed was computed by multiplying % fat by the pounds of final miscella.

The other parameter evaluated at equilibrium was dynamic holdup and this was measured as the weight difference between flooded bed and drained bed. Dynamic holdup is recorded in Table 1 in pounds of miscella.

This process was repeated 4 times and simulates 5 stages of cross-flow extraction. For each pass fat removed per pass, percolation rate, and dynamic holdup was measured and recorded and in Table 1.

After the fifth stage of extraction, the drained flakes were air dried and static holdup was measured as the difference in weight before and after drying. Static holdup is recorded in Table 1 in pounds of hexanes.

The air dried defatted material was then analyzed for protein, fat, moisture, and NSI by the appropriate AOCS procedure. Initial NSI was determined by slicing peanuts as in AOCS methos Ab 3-49, soxhlet extracted with hexane for 16 hrs. and the NSI determined by AOCS procedure. NSI determinations were conducted to indicate the loss of protein solubility from the conditioning steps.

TABLE 1

| | 1a SPLITS | 1b CRACKED | 1c Granu-LATED |
|---|---|---|---|
| Conditioned Flake Moisture after wet heat conditioning but prior to dry heat conditioning | 10.2% | 9.2% | 10.2% |
| Dried Flake Moisture after dry heat conditioning but prior to extraction | 4.1% | 3.1% | 3.5% |
| Initial Weight of Flakes | 20.75 lbs. | 20.00 lbs. | 20.00 lbs. |
| Solvent to Solids Ratio (Hexanes) | 2 to 1 | 2 to 1 | 2 to 1 |
| Bed Height (6 inch diameter) | 4.00 ft. | 4.00 ft. | 4.00 ft. |
| Initial Fat Content of Extraction Bed | 10.382 lbs. | 10.581 lbs. | 10.349 lbs. |
| Fat Removed Per Pass In Pounds | | | |
| 1. | 7.073 | 7.467 | 7.175 |
| 2. | 2.151 | 2.257 | 2.131 |
| 3. | 0.600 | 0.622 | 0.571 |
| 4. | 0.173 | 0.170 | 0.188 |
| 5. | 0.097 | 0.065 | 0.085 |
| Final Fat Content of Extracted Flakes | 0.288 | 0.176 | 0.199 |
| Equilibrium Percolation Rate Per Pass In Gals./Ft.²/Min. | | | |
| 1. | 22.42 | 14.74 | 22.64 |
| 2. | 29.81 | 19.69 | 24.45 |
| 3. | 27.55 | 20.77 | 26.46 |
| 4. | 28.44 | 21.37 | 27.01 |
| 5. | 29.27 | 21.65 | 27.01 |
| Dynamic Holdup Per Pass in Pounds | | | |
| 1. | 14.0 | 11.75 | 13.0 |
| 2. | 13.5 | 12.50 | 13.0 |
| 3. | 13.5 | 12.50 | 13.0 |
| 4. | 13.0 | 12.70 | 13.5 |
| 5. | 14.5 | 12.75 | 13.25 |
| Static Holdup in Pounds | 8.666 | 10.363 | 9.349 |
| Initial Protein Solubility (NSI) | 92.2 | 92.2 | 92.2 |
| Final Protein Solubility (NSI) | 70.9 | 71.6 | 69.2 |

EXAMPLE 2

This example illustrates the effect dry conditioning following flaking has on the wet conditioned granulated peanut pieces. 2a. Granulated peanuts were conditioned and flaked as described in example 1c. The flaked peanuts were dried for 7 minutes at 180° F to a final moisture of 7.6%.

2b. Granulated peanuts were conditioned and flaked as described in example 1c. The flaked peanuts were dried for 35 minutes at 180° F to a final moisture of 2.0%.

2C. Data from example 1c above is included in Table 2 and represents drying to 3.5%.

The extraction parameters were determined as an example 1 for dried flakes 2a and 2b reported in Table 2.

TABLE 2

| | 2a | 2b | 2c |
|---|---|---|---|
| Conditioned Flake Moisture after wet heat conditioning but prior to dry heat conditioning | 10.6% | 10.7% | 10.2% |
| Dried Flake Moisture after dry heat onditioning but prior to extraction | 7.6% | 2.0% | 3.5% |
| Initial Weight of Flakes | 20.00 lbs. | 19.85 lbs. | 20.00 lbs. |
| Solvent to Solids Ratio (Hexanes) | 2 to 1 | 2 to 1 | 2 to 1 |
| Initial Fat Content of Extraction Bed | 10.534 lbs. | 10.259 lbs. | 10.349 lbs. |
| Fat Removed Per Pass in Pounds | | | |
| 1. | 6.21 | 6.55 | 7.175 |
| 2. | 2.37 | 2.21 | 2.131 |
| 3. | 0.827 | 0.67 | 0.571 |
| 4. | 0.310 | 0.248 | 0.188 |
| 5. | 0.121 | 0.115 | 0.085 |
| Final Fat Content of Extracted Flakes | 0.693 | 0.466 | 0.199 |
| Equilibrium Percolation Rate Per Pass In Gals./Ft.²/Min. | | | |
| 1. | 9.53 | 23.03 | 22.64 |
| 2. | 15.82 | 27.35 | 24.45 |
| 3. | 16.76 | 29.47 | 26.46 |
| 4. | 16.47 | 30.20 | 27.01 |

TABLE 2 -continued

| | 2a | 2b | 2c |
|---|---|---|---|
| 5. | 15.67 | 30.25 | 27.01 |
| Dynamic Holdup Per Pass In Pounds | | | |
| 1. | 9.50 | 12.75 | 13.0 |
| 2. | 10.50 | 13.50 | 13.0 |
| 3. | 11.50 | 14.50 | 13.0 |
| 4. | 10.75 | 13.50 | 13.5 |
| 5. | 9.50 | 14.00 | 13.25 |
| Static Holdup In Pounds | 11.11 | 8.95 | 9.349 |
| Initial Protein Solubility Index (NSI) | 92.2 | 92.2 | 92.2 |
| Final Protein Solubility Index (NSI) | 77.5 | 71.9 | 69.2 |

EXAMPLE 3

This example illustrates the effect of solvent temperature on the extraction by comparing extraction parameters of peanuts treated as in example 1.

3a. 30 lbs. of blanched peanut splits were processed as in 1c. The flakes were extracted with hexanes at a temperature of 75° F.

3b. 30 lbs. of blanched peanut splits were processed as in 1c. The flakes were extracted with hexanes at a temperature of 100° F.

3c. 30 lbs. of blanched peanut splits were processed as in 1c. The flakes were extracted with hexanes at a temperature of 130° F. The results are shown in Table 3.

TABLE 3

| | 3a 75° F | 3b 100° F | 3c 130° F |
|---|---|---|---|
| Conditioned Flake Thickness in Inches | .030-.035 | .030-.035 | .030-.035 |
| Conditioned Flake Moisture after wet heat conditioning but prior to extraction | 10.2% | 10.3% | 10.1% |
| Dried Flake Moisture after dry heat conditioning but prior to extraction | 3.6% | 4.0% | 3.9% |
| Initial Weight of Flakes | 19.85 lbs. | 19.85 lbs. | 20.50 lbs. |
| Depth of Bed to be Extracted | 4.0 ft. | 4.0 ft. | 4.0 ft. |
| Solvent to Solids Ratio (Commercial Hexane) | 2 to 1 | 2 to 1 | 2 to 1 |
| Initial Fat Content of Extraction Bed | 10.01 lbs. | 10.51 lbs. | 10.90 lbs. |
| Fat Removed Per Pass in Pounds (30 Mins./Pass | | | |
| 1. | 6.363 | 7.043 | 7.157 |
| 2. | 2.073 | 2.110 | 2.166 |
| 3. | 0.663 | 0.621 | 0.720 |
| 4. | 0.217 | 0.216 | 0.311 |
| 5. | 0.114 | 0.108 | 0.147 |
| Final Fat Content of Extracted Flakes | 0.574 | 0.410 | 0.399 |
| Equilibrium Percolation Rate Per Pass In Gals./Ft.$^2$/Mins. | | | |
| 1. | 16.78 | 18.29 | 17.92 |
| 2. | 27.84 | 28.61 | 16.62 |
| 3. | 31.50 | 31.09 | 22.83 |
| 4. | 32.06 | 31.67 | 24.53 |
| 5. | 31.72 | 31.69 | 26.96 |
| Dynamic Holdup Per Pass in Pounds | | | |
| 1. | 14.75 | 15.0 | 13.0 |
| 2. | 14.50 | 14.5 | 11.5 |
| 3. | 15.0 | 12.5 | 12.5 |
| 4. | 13.75 | 13.6 | 14.0 |
| 5. | 16.0 | 16.0 | 16.0 |
| Static Holdup in Pounds | 9.106 | 8.970 | 9.945 |
| Initial Protein Solubility (NSI) | 92.2 | 92.2 | 92.2 |
| Final Protein Solubility (NSI) | 70.8 | 69.4 | 72.9 |

EXAMPLE 4

This example illustrates the effect of using different solvents by comparing extraction parameters of peanuts treated as in example 1.

4a. 30 lbs. of blanched peanuts splits were processed as in 1c. The flakes were extracted with acetone at 100° F.

4b. 30 lbs. of blanched peanut splits were processed as in 1c. The flakes were extracted with hexanes at a temperature of 100° F. This is the same data as presented in Table 1.

The results are shown in Table 4.

TABLE 4

| | 4a ACETONE | 4b HEXANE |
|---|---|---|
| Conditioned Flake Thickness In Inches | 0.02-.030 | 0.02-.030 |
| Conditioned Flake Moisture | 10.3% | 10.2% |
| Dried Flake Moisture Prior to Extraction | 4.4% | 4.1% |
| Initial Weight of Flakes | 19.50 lbs. | 20.75 lbs. |
| Depth of Bed to be Extracted | 4.0 ft. | 4.0 ft. |
| Solvent to Solids Ratio | | |

TABLE 4-continued

| | 4a ACETONE | 4b HEXANE |
|---|---|---|
| (Commercial Hexane) | 2 to 1 | 2 to 1 |
| Initial Fat Content of Flakes | 9.945 lbs. | 10.382 lbs. |
| Fat Removed Per Pass in Pounds (30 Mins./Pass) | | |
| 1. | 5.96 | 7.073 |
| 2. | 2.203 | 2.151 |
| 3. | 0.818 | 0.600 |
| 4. | 0.353 | 0.173 |
| 5. | 0.174 | 0.097 |
| Final Fat Content of Extracted Flakes | 0.437 | 0.288 |
| Equilibrium Percolation Rate Per Pass in Gals./Ft.$^2$/Mins. | | |
| 1. | 27.27 | 22.42 |
| 2. | 29.92 | 29.81 |
| 3. | 30.90 | 27.55 |
| 4. | 30.92 | 28.44 |
| 5. | 30.92 | 29.27 |
| Dynamic Holdup Per Pass in Pounds | | |
| 1. | 12.5 | 14.0 |
| 2. | 15.5 | 13.5 |
| 3. | 15.0 | 13.5 |
| 4. | 15.7 | 13.0 |
| 5. | 16.0 | 14.5 |
| Static Holdup in Pounds | 10.68 | 8.666 |
| Initial Protein Solubility (NSI) | 92.2 | 92.2 |
| Final Protein Solubility (NSI) | 74.2 | 70.9 |

EXAMPLE 5

This example illustrates the effect of wet heat conditioning and flaking by comparing extraction parameters of peanuts, treated as in example 1, in examples 5a–e with those not preconditioned as in example 5f.

5a. 30 lbs. of blanched peanut splits were processed as in 1c above. The peanut splits were wet heat conditioned as in example 1 and the flaking roll gap was 0.008 inch.

5b. 30 lbs. of blanched peanut splits were processed as in 1c above. The peanut splits were wet heat conditioned as in example 1 and the flaking roll gap was 0.008 inch.

5b. 30 lbs. of blanched peanut splits were processed as in 1c above. The peanut splits were wet heat conditioned as example 1. The flaking roll gap was 0.005 inch.

5c. 30 lbs. of branched peanut splits were processed as in 1c above. The peanut splits were wet heat conditioned as in example 1. The flaking roll gap was 0.014 inch.

5d. 30 lbs. of peanut granules as in 1c above were wet heat conditioned for 45 minutes at 160° F. The conditioned peanut granules were flaked as in example 1 with the flaking rolls adjusted with a gap of 0.014 inch.

5e. 30 lbs. of peanut granules as in 1c above except that they were wet heat conditioned for 2 minutes at 250° F. The conditioned peanut granules were flaked as in example 1 with the flaking rolls adjusted with a gap of 0.014 inch.

5f. 30 lbs. of peanut splits were sliced to a thickness of 0.030 inch. No wet heat conditioning was performed. Slices were dried to 3.5% moisture and extracted in example 1.

The effect preconditioning has on fat extraction can clearly be seen from table 5 by comparing the final fat content of the extracted flakes of 5f which was not conditioned with that of examples 5a–e. Also the effect of a temperature above about 240°, i.e. 250°, on protein solubility can be seen from example 5e where a final protein solubility of only 63.7 was obtained rendering the protein less acceptable for food applications where high protein solubility is essential.

TABLE 5

| | 5a .008 | 5b .005 | 5 .014 | 5d .014 | 5e .014 | 5f sliced |
|---|---|---|---|---|---|---|
| Flaking Roll Gap | | | | | | |
| Conditioned Flake Thickness in Inches | .020–.030 | .015–.020 | .025–.035 | .025–.030 | .025–.030 | .020 |
| Conditioned Flake Moisture after wet heat conditioning but prior to dry heat conditioning | 10.0% | 9.6% | 9.4% | 8.1% | 9.9% | 6.4% |
| Dried Flake Moisture after dry heat conditoning but prior to Extraction | 1.9% | 2.4% | 2.8% | 2.4% | 2.7% | 3.5% |
| Initial Weight of Flakes | 19.85 | 19.85 | 19.85 | 19.85 | 19.85 | 19.85 |
| Depth of Bed to be Extracted | 4.0 ft. | 4.0 ft. | 4.0 ft. | 4.0 ft. | 4.0 ft. | 4.0 ft. |
| Solvent to Solids Ratio (Commercial Hexane) | 2.5 to 1 | 2.5 to 1 | 2.5 to 1 | 2 to 1 | 2 to 1 | 2 to 1 |
| Initial Fat Content of Flakes | 10.710 lbs. | 10.844 lbs. | 10.720 lbs. | 10.083 lbs. | 11.087 lbs. | 10.269 lbs. |
| Fat Removed Per Pass in Pounds (30 Mins./Pass) | | | | | | |
| 1. | 7.338 | 8.009 | 7.593 | 6.547 | 7.229 | 4.789 |
| 2. | 2.425 | 2.030 | 2.034 | 2.210 | 2.266 | 1.594 |
| 3. | 0.543 | 0.479 | 0.498 | 0.657 | 0.706 | 0.759 |
| 4. | 0.165 | 0.129 | 0.194 | 0.231 | 0.258 | 0.523 |
| 5. | 0.062 | 0.062 | 0.173 | 0.103 | 0.147 | 0.494 |
| Final Fat Content of Extracted Flakes | 0.172 | 0.135 | 0.228 | 0.334 | 0.481 | 2.107 |
| Equilibrium Percolation Rate Per Pass in Gals./Ft.$^2$/Mins. | | | | | | |
| 1. | 16.87 | 10.87 | 19.35 | 14.77 | 22.40 | 19.03 |
| 2. | 14.30 | 13.01 | 20.49 | 18.56 | 25.52 | 17.40 |
| 3. | 14.83 | 13.66 | 21.67 | 19.23 | 26.82 | 17.62 |

TABLE 5-continued

| | 5a .008 | 5b .005 | 5 .014 | 5d .014 | 5e .014 | 5f sliced |
|---|---|---|---|---|---|---|
| 4. | 15.28 | 13.70 | 20.98 | 18.89 | 25.33 | 17.69 |
| 5. | 14.91 | 13.75 | 21.01 | 18.53 | 28.15 | 18.12 |
| Dynamic Holdup Per Pass In Pounds | | | | | | |
| 1. | 12.25 | 12.20 | 11.50 | 12.75 | 14.00 | 14.75 |
| 2. | 12.00 | 11.70 | 13.00 | 11.00 | 14.00 | 14.75 |
| 3. | 12.25 | 12.50 | 13.50 | 11.25 | 14.25 | 14.25 |
| 4. | 12.25 | 12.00 | 12.75 | 11.00 | 14.00 | 15.00 |
| 5. | 11.75 | 13.00 | 12.50 | 11.50 | 14.50 | 14.75 |
| Static Holdup in Pounds | 9.742 | 9.587 | 11.09 | 9.929 | 11.36 | 8.64 |
| Initial Protein Solubility (NSI) | 92.2 | 92.2 | 92.2 | 92.2 | 92.2 | 92.2 |
| Final Protein Solubility (NSI) | 76.7 | 76.2 | 77.1 | 83.1 | 63.7 | 92.2 |

EXAMPLE 6

This example illustrates the effect of unblanched peanuts by comparing the extraction parameters of blanched versus unblanched peanuts.

6a. 30 lbs. of blanched peanut splits were processed as in 1b. The flakes were extracted with hexanes at 100° F.

6b. 30 lbs. of unblanched peanut splits were processed as in 1b. The flakes were extracted with hexanes at 100° F.

The results are shown in Table 6.

TABLE 6

| | With Skins (Unblanched) | Without Skins (Blanched) |
|---|---|---|
| Conditioned Flake Thickness in Inches | .015 – .025 | .015 – .020 |
| Conditioned Flake Moisture after wet heat conditioning but prior to dry heat conditioning | 10.14% | 9.6% |
| Dried Flake Moisture after dry heat conditioning but prior to extraction | 2.90% | 2.4% |
| Initial Weight of Flakes | 19.85 lbs. | 19.85lbs. |
| Depth of Bed to be Extracted | 4.0 ft. | 4.0 ft. |
| Solvent to Solids Ratio (Commercial Hexane) | 2.5 to 1 | 2.5 to 1 |
| Initial Fat Content of Flakes | 11.690 lbs. | 10.844 lbs. |
| Fat Removed Per Pass in Pounds (30 Mins./Pass) | | |
| 1. | 7.604 | 8.009 |
| 2. | 3.247 | 2.030 |
| 3. | 0.559 | 0.479 |
| 4. | 0.097 | 0.129 |
| 5. | 0.071 | 0.062 |
| Final Fat Content of Extracted Flakes | 0.119 | 0.135 |
| Equilibrium Percoltion Rate Per Pass in Gals./Ft.$^2$/Mins. | | |
| 1. | 12.65 | 10.87 |
| 2. | 15.47 | 13.01 |
| 3. | 15.90 | 13.66 |
| 4. | 16.48 | 13.70 |
| 5. | 17.32 | 13.75 |
| Dynamic Holdup Per Pass in Pounds | | |
| 1. | 14.0 | 12.2 |
| 2. | 13.5 | 11.7 |
| 3. | 13.5 | 12.5 |
| 4. | 13.0 | 12.0 |
| 5. | 13.5 | 13.0 |
| Static Holdup in Pounds | 11.240 | 9.587 |
| Initial Protein Solubility (NSI) | 92.2 | 92.2 |
| Final Protein Solubility (NSI) | 72.8 | 76.2 |

We claim:

1. A method for the direct solvent extraction of oil from peanuts to produce a low-fat proteinaceous material which comprises, wet heat conditioning at a temperature of from 160° to 240° F whole peanuts, peanut splits, peanut granules, or cracked peanuts to a moisture content of more than 6 but less than 12%, flaking said wet heat conditioned peanuts, dry heat conditioning said flaked peanuts to a moisture content of from 1.9 to 6% and treating said dry heat conditioned flakes with a solvent selected from the group consisting of alcohols, ketones, hydrocarbons, and halogenated hydrocarbons, for the removal of oil contained in said flakes.

2. The method of claim 1 wherein the wet heat condition is affected at a temperature of from 160° to 240° F for from 2 to 45 minutes.

3. The method of claim 1 wherein the peanuts are whole peanuts.

4. The method of claim 1 wherein the peanuts are peanut splits.

5. The method fo claim 1 wherein the peanuts are peanut granules.

6. The method of claim 1 wherein the peanuts are cracked peanuts.

7. The method of claim 1 wherein the solvent is hexanes.

8. The method of claim 1 wherein said solvent is acetone, ethyl alcohol, isopropyl alcohol, methylene chloride, trichloroethane, trichloroethylene, tetrachloroethylene, fluorinated hydrocarbons or chlorinated hydrocarbons.

9. The method of claim 1 wherein the wet heat conditioned peanuts are cooled prior to flaking.

10. The method of claim 1 wherein the flakes are treated with a solvent in a stationary bed extraction.

11. The method of claim 1 wherein the flakes are treated with a solvent in a counter flow process.

12. The method of claim 1 wherein the flakes are treated with a solvent in a cross flow process.

13. The method of claim 1 wherein the flakes are treated with the solvent under vacuum.

14. The method of claim 1 wherein the temperature of the solvent is maintained at a temperature of about 140° F.

15. The method of claim 1 wherein the flakes are treated with a solvent which is maintained at a temperature of between 75° and 140° F.

16. The method of claim 1 wherein the flakes are treated with a solvent which comprises a mixture of solvents for the removal of oil in the peanut.

17. The method of claim 1 wherein the peanuts are blanched peanuts.

18. The method of claim 1 wherein the peanuts are unblanched peanuts.

19. The method of claim 1 wherein the dry heat conditioning is performed by rapid drying using a forced heating system to yield the product with a final moisture content of from 2.5 to 4%.

20. The method of claim 1 wherein the wet heat conditioning is affected at a temperature of from 200° to 220° F for 10 to 20 minutes to wet heat condition the peanuts to a moisture content of from 8 to 11% prior to flaking.

21. The method of claim 1 wherein the wet heat conditioning plasticizes the oil seed meat while keeping protein denaturation at a minimum.

* * * * *